Patented Mar. 13, 1923.

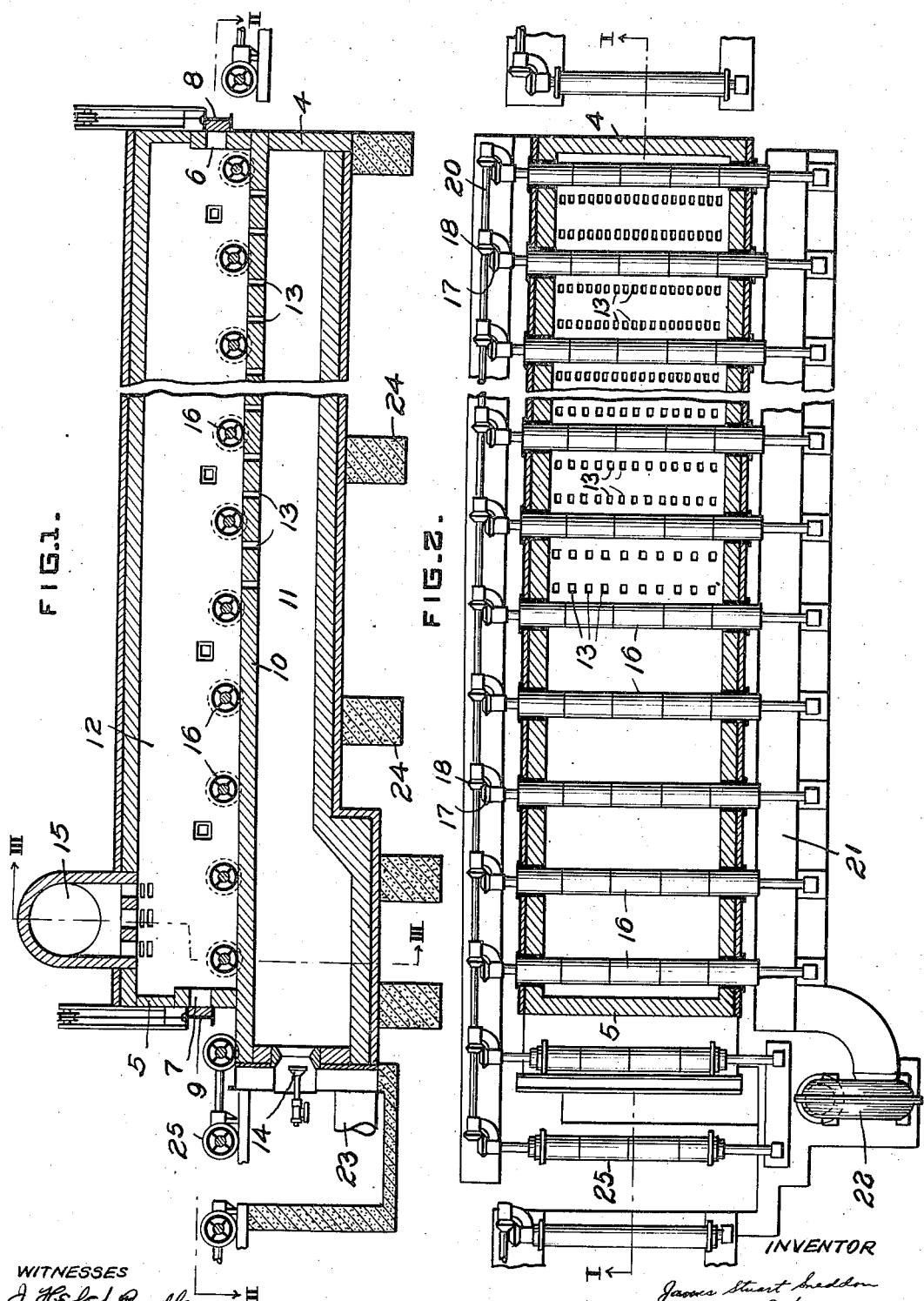

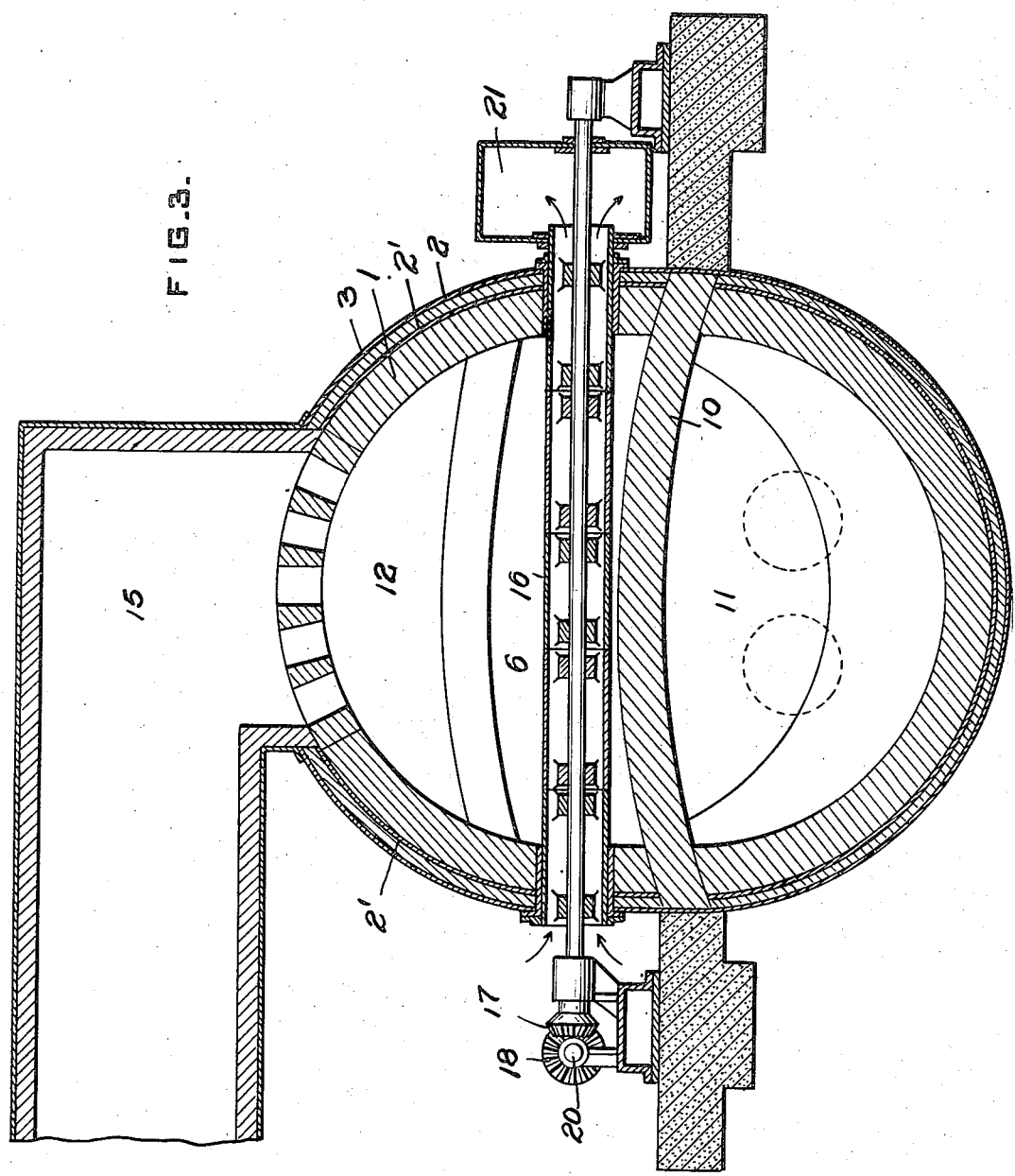

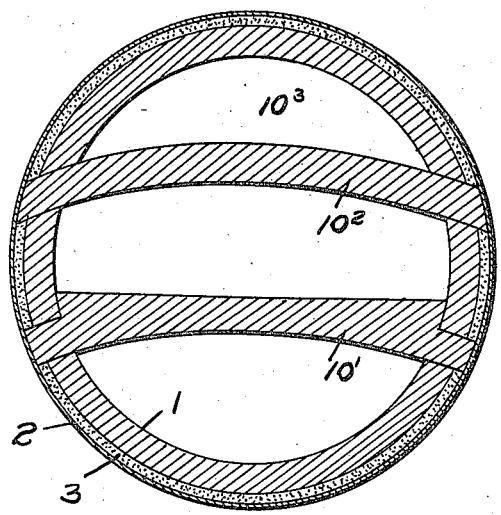
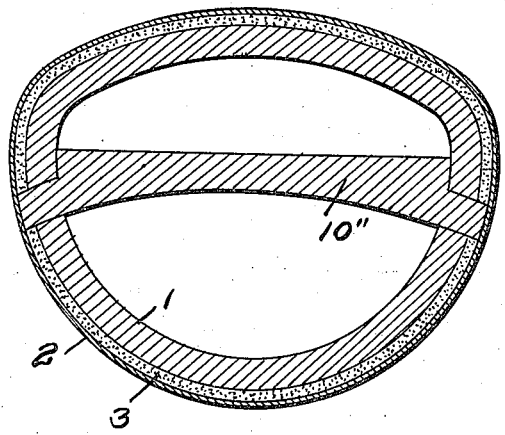

1,448,162

UNITED STATES PATENT OFFICE.

JAMES P. SNEDDON, DECEASED, LATE OF BAYONNE, NEW JERSEY, BY JAMES STUART SNEDDON, OF BAYONNE, NEW JERSEY, AND EDWARD R. STETTINIUS, OF NEW YORK, N. Y., EXECUTORS, ASSIGNORS TO PITTSBURGH SEAMLESS TUBE COMPANY, OF BEAVER FALLS, PENNSYLVANIA, A CORPORATION OF PENNSYLVANIA.

FURNACE.

Application filed November 4, 1921. Serial No. 512,952.

*To all whom it may concern:*

Be it known that JAMES P. SNEDDON, deceased, late a citizen of the United States, resident of Bayonne, in the county of Hudson and State of New Jersey, has invented a new and useful Furnace, of which the following is a specification.

The invention relates to stationary horizontal or approximately horizontal industrial furnaces and ovens of various kinds, such as annealing furnaces for steel products, metal heating furnaces for forging, rolling and tube mill work, metal refining furnaces, reverberatory furnaces, open hearth furnaces, roasting furnaces, malleable iron furnaces, soaking pit furnaces, glass melting tanks, glass annealing furnaces, by-product coke furnaces, and other similar industrial heating furnaces or ovens which ordinarily are built of refractory brick or blocks to provide a heating chamber comprising a hearth or floor, side walls and a roof or crown.

Heretofore, furnaces and ovens of the character described have been of substantially rectangular cross-section, built of refractory brick or blocks and comprising vertical side walls and an arched crown or roof sprung between or on top of the side walls, and of such size that the resulting stresses required that their walls be thick and held together by various arrangements of buck stays and tie bolts, skewbacks, or suspended metallic arch hangers or supports. When such furnaces or ovens built according to the usual practice, are fired or heated up, the refractory lining expands, the joints open up and the bricks crack, thus exposing larger areas of the refractory brick or blocks for the absorption of heat, with the result that the refractory lining disintegrates or burns out, the roof or crown rapidly weakens and collapses, and the side walls become cracked and open at the joints with a resultant large loss or dissipation of heat. Furthermore, the expansion of the refractory lining makes it necessary to loosen the tie rods in order to prevent the buck stays or tie rods from breaking or the wall from collapsing. Furthermore, this prior construction requires such thickness of wall and roof or crown and such heavy and strong buck stays, tie rods and the like, in order to secure reasonable strength and durability, that the cost of construction is correspondingly high, and this together with the short life of furnaces so constructed renders them expensive. The opening up of the seams in the wall and the cracking and dropping out of the brick also renders such furnaces uneconomical in operation due to the large dissipation of heat.

In an application of even date herewith, Serial No. 512,950 (Case A) I have illustrated and described a construction of furnaces and ovens of the kind and for the purposes named whose initial cost is considerably less than that of present designs of such furnaces and ovens but whose durability or life nevertheless is much longer, which are so constructed as to automatically take care of the expansion and contraction of the walls which occur when the furnaces are being heated up or cooled down, and in which the loss of heat by radiation is reduced, thereby effecting economy in the consumption of fuel, said furnaces or ovens comprising a stable structure formed by walls which, in lieu of being rectangular in cross-section, are in the form of a circle, ellipse, or other continuous-curve form approximately a circle or ellipse, and consisting of a continuous inner wall built up of refractory brick or blocks and being under compression, and an outer continuous-curve sheet metal casing or shell surrounding the compression wall and forming a tension member which resists radial and tangential stresses due to the expansion of the compression wall, said stable structure being such as to automatically take care of the expansions and contractions which occur when the furnace is being heated up or cooled down.

In the application above identified various forms of continuous-curve furnaces or ovens are illustrated and described, all of said forms being generically claimed and some of them being specifically claimed.

The present application covers several of the forms illustrated in the above identified application, but not specifically claimed therein, and in which the stresses in the furnace are in part due to transverse arches in the form of flattened arcs of circles sprung across the furnace chamber. In this aspect the invention is applicable to all furnaces and ovens of the character specified whether of the direct heating, semi-muffled, or muffled type.

A further object of the invention covered by the present application is to specifically adapt the furnace construction above described to continuous heating or annealing furnaces. A further object is to improve the operation of continuous heating or annealing furnaces by a superior control of temperature range and quality of combustion. A further object is to provide a construction in which air for combustion is heated prior to its use in the furnace by a recuperating action, thereby conserving heat and adding to the economy of operation.

In the accompanying drawings Fig. 1 is a vertical central sectional view illustrating the applicability of the invention to a continuous heating furnace adapted primarily for heating metal tubes, the plane of view being indicated by the line I—I, Fig. 2;
Fig. 2 a horizontal sectional view taken on the line II—II Fig. 1; Fig. 3 a transverse sectional view to enlarged scale taken on the broken line III—III Fig. 1; Fig. 4 a transverse sectional view through the body of a modified form of furnace, in which an additional transverse arch is sprung across the same; and Fig. 5 a similar view of a still further modification in which the roof or crown portion is in the form of a flattened arc of a circle.

In the forms illustrated, the body of the furnace is in cross-section a continuous curve comprising an inner lining 1 of refractory material and an outer casing or shell 3 as a tension member, preferably in the form of a continuous metal jacket so formed and constructed as to resist radial and tangential tension under which it is stressed by reason of thermal expansion and weight of the inner refractory lining and arches.

When the inner lining becomes heated and expands it is held against rupture, that is to say, against cracking by reason of the outer metal jacket with the result that only the inner faces of the refractory brick or blocks which form the inner lining are exposed and subjected to the heat of the furnace. Thus, it becomes unnecessary to construct the refractory wall or lining of the great thickness hitherto required in the usual type of furnaces for the purpose of properly guarding against the effects of thermal expansion and the cracking resulting therefrom.

In the preferred construction, the longitudinal wall of the furnace comprises an inner renewable lining of refractory material, a permanent lining of refractory brick or monolithic construction as a cushioning member of the structure, an intermediate lining of insulating material and an outer casing of plate metal. These features are particularly illustrated in Fig. 3 which shows the longitudinal wall of the furnace as being formed of an inner renewable and replaceable lining 1 of refractory material such as fire brick, a second lining of refractory material such as fire brick or refractory monolithic construction 2, an intermediate insulating lining 2' of suitable insulating material, and an outer jacket 3 of curved steel plate. The material used for the lining 2 may be magnesia, while the heat insulating lining 2' may be in the form of asbestos boards, although other heat insulating materials may be used.

In the particular furnace shown in Figs. 1 to 3, the opposite ends of the longitudinal wall are closed by means of vertical walls 4 and 5 which may be straight or cambered, the former of which is provided with a charging opening 6 and the latter with a discharge opening 7. These openings may be closed by means of suitable vertically movable doors 8 and 9, respectively, arranged and operated in the manner indicated in Fig. 1. Within the furnace there is arranged a transversely disposed wall 10 extending from one side to the other of the cylindrical wall, preferably, in the form of a flattened arc of a circle, thus providing a strong supporting arch built upon the haunches and whose upper surface will lie in a substantially horizontal plane adapted to receive and support materials to be heated, and dividing the furnace into a lower combustion chamber 11 and an upper heating chamber 12. If the furnace is of the semi-muffled type, as is the furnace shown herein, the wall 10 may be provided with openings 13 through which the products of combustion may pass from the combustion into the heating chamber. These openings are provided in the portion of the wall 10 remote from the place of initial combustion of the heated fuel and the openings are preferably of increasing number so as to increase their capacity for equalizing and controlling temperatures the farther away they are from such place of combustion, as clearly shown in Fig. 2.

While the heating medium of the furnace may be any combustible substance, such as gas, coal and the like, the furnace shown herein is provided with oil burners 14 for fuel oil, the air for supporting combustion being supplied in a manner presently to be explained. The products of combustion flow from left to right as the furnace is viewed in Fig. 1 and pass through the openings 13 into the heating chamber 12 from which they flow through a suitable outlet 15 leading to a stack or other point of discharge not shown.

For supporting metal within the furnace and for moving it from one end to the other, there is preferably provided a series of rollers 16 which project through the sides of the furnace and are each connected at one end to bevel pinions 17 meshing with pinions 18 attached to a driving shaft 20 whereby all the rollers may be rotated simultaneously. While the rollers may be of any desired construction, they are preferably hollow so that air may be drawn through them for keeping them cool. The other end of each roller may, as indicated in Fig. 3 communicate with an air conduit 21 connected with a fan or blower 22, the outlet end of which is connected by means of a conduit 23 to the oil burners 14 for supplying air to support the combustion of the oil. Thus, the air for combustion becomes preheated by the cooling of the metal moving rollers with manifest economy in the conservation of heat.

The furnace may be supported in its stationary longitudinal position upon a series of suitably spaced foundations 24 rather than upon a continuous foundation, a construction which further reduces the cost of the furnace and which is made possible by the use of a furnace wall such as described. By such construction, not only a saving in material and labor is accomplished, but substantially the whole exterior of the furnace is openly exposed to the atmosphere as a cooling agent, the air being free to circulate through the spaces between the spaced foundations 24 as well as around the sides and top, or if any other method of cooling is desirable, the same may be more readily applied and is more effective, due to the unobstructed exterior of the furnace.

In operating the furnace, blanks, such as tubes to be annealed, are placed in the furnace through the charging opening 6 and are advanced through the furnace by the rollers 16. When properly heated, or heated and cooled, the blanks are discharged from the furnace through the discharge opening 7, a suitable roller table 25 being provided to receive the heated tubes.

In each of the forms shown the outer shell 3, acting as a tension member, cooperates with the inner refractory compression wall 1 to form a stable structure. Whenever the furnace is heated up, the wall 1 expands putting the intermediate lining 2 under greater compression, which in turn is resisted by the tension member 3, and serves to bind closely together the bricks or other refractory members rather than open cracks therein. It has been found that various materials adapted to be used for the refractory lining have varying coefficients of expansion and that some even possess a negative coefficient of expansion after reaching predetermined temperatures. The use of the intermediate compressible lining 2 compensates for all these various degrees and ratios of expansion keeping the inner wall and shell in intimate contact and assures the body constituted by the wall 1, lining 2 and tension member 3 being maintained stable at all times regardless of the degree to which the furnace is heated and whether the same is being heated up or cooled down. Besides functioning as a means to compensate for the various degrees of expansion and to maintain a stable structure, the lining 2 also functions as a means to prevent the dissipation of heat.

In the forms illustrated in Figs. 4 and 5 the additional layer 2' of heat insulating material has been omitted, the longitudinal wall merely comprising the inner refractory wall 1, the intermediate cushioning layer 3 and the outer metal tension member or shell 2. In said figures the transverse arches 10' and 10'' which correspond to arch 10 of Fig. 3, have their upper surfaces flattened so as to better adapt the same as supporting surfaces. In Fig. 5 the roof or crown portion is somewhat closer to the supporting arch than in Fig. 3 and is in the form of a flattened arc of a circle. In the modification illustrated in Fig. 4 an additional transverse arch $10^2$ is sprung across the furnace, the arches 10' and $10^2$ cooperating in a manner similar to the arch 10'' and the roof in Fig. 5, and providing a flue $10^3$ between arch $10^2$ and the top of the furnace which may be used for recuperation purposes.

The constructions described accomplish the prevention of disintegration and burning out of the inner refractory wall, reduction in the quantity of material required and consequent cost of material and labor for installation, decreased cost of repair and replacement, elimination of the expensive and objectionable skew-backs and buck stays, conservation of heat, prolongation of the life of the furnace, and reduction in the weight of the furnace permitting the use of lighter and spaced apart foundations for supporting the same.

We claim:

1. A stationary substantially horizontal furnace comprising a stable curved wall formed of an inner lining of refractory material as a compression member and an outer casing of metal connected to resist tangential tension whereby the inner refractory lining is held against rupture due to outward thrust and thermal expansion thereof, and arched supporting means within the furnace sprung across said curved compression wall and constantly producing outward thrust.

2. A stationary substantially horizontal metal-heating furnace comprising a stable curved compression wall formed of an inner lining of refractory material and an outer casing of sheet metal formed into a continuous curved jacket and capable of resisting tangential tension and outward thrust, a layer of heat insulating material arranged between said lining and outer casing, and arched metal-supporting means within the furnace sprung across said curved compression wall constantly producing outward thrust.

3. A stationary substantially horizontal metal-heating furnace comprising a stable curved compression wall formed of an inner lining of refractory material and an outer casing of metal connected to resist tangential tension, and an arched wall extending from one side to the other of said cylindrical wall and dividing the furnace interiorly into combustion and heating chambers.

4. A stationary substantially horizontal metal-heating furnace comprising a stable curved wall as a compression member formed of an inner lining of refractory material and an outer casing of metal connected to resist tangential tension, a wall extending transversely from one side to the other of said compression wall and dividing the furnace into combustion and heating chambers, means for maintaining combustion at one end of the combustion chamber, and openings through said transverse wall at the other end of the combustion chamber permitting the flow of heated gases into the heating chamber.

5. A stationary substantially horizontal furnace or oven comprising a stable continuous-curve inner wall of refractory material as a compression member, a transverse wall sprung across the same constantly producing outward thrust, and an outer metal shell for maintaining the inner wall under compression and resisting stresses due to expansion thereof and the thrust of said transverse wall.

6. A stationary substantially horizontal furnace or oven comprising a stable continuous-curve inner wall of refractory material as a compression member, a transverse wall sprung across the same constantly producing outward thrust and an outer metal shell for maintaining the inner wall under compression and resisting said outward thrust but permitting expansion and contraction thereof.

7. A stationary substantially horizontal furnace or oven comprising a stable continuous-curve inner wall of refractory material as a compression member, a pair of transverse walls sprung across the same and cooperating therewith to form air supply and recuperation passages, and an outer metal shell for maintaining the inner wall under compression and resisting stresses due to expansion thereof.

8. A stationary substantially horizontal furnace or oven of the kind described comprising a stable structure which in cross-section is a continuous-curve wall and having sprung across the same an arch formed on a chord of a circle constantly producing outward thrust, said continuous-curve wall consisting of an inner wall built up of refractory brick or blocks and forming a compression member, and an outer sheet metal shell surrounding said compression wall and forming a tension member to resist outward thrusts of said arch.

9. A stationary substantially horizontal furnace or oven of the kind described comprising a stable structure which in cross section is a continuous-curve wall consisting of an inner wall built up of refractory brick or blocks and forming a compression member, and an outer sheet metal shell surrounding said compression wall and forming a tension member to resist the radial and tangential stresses due to outward thrust and the expansion of the compression wall, the furnace being supported by spaced apart foundations so as to permit the free passage of air therebetween to cool the same.

In testimony whereof, we sign our names.

JAMES STUART SNEDDON,
EDWARD R. STETTINIUS,
*Executors of James P. Sneddon, deceased.*